(12) United States Patent
Deshpande et al.

(10) Patent No.: US 10,936,313 B2
(45) Date of Patent: Mar. 2, 2021

(54) APPARATUS AND METHOD FOR CONFIGURING SETS OF INTERRUPTS

(71) Applicant: Intel Corporation, Santa Clara, CA (US)

(72) Inventors: Yogesh Deshpande, Belgaum (IN); Pandurang V. Deshpande, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/255,438

(22) Filed: Jan. 23, 2019

(65) Prior Publication Data

US 2020/0004537 A1    Jan. 2, 2020

Related U.S. Application Data

(63) Continuation of application No. 14/861,618, filed on Sep. 22, 2015, now Pat. No. 10,296,335.

(30) Foreign Application Priority Data

Sep. 26, 2014 (IN) .......................... 4721 /CHE/2014
Jan. 6, 2015 (IN) .......................... 4721/CHE/2014

(51) Int. Cl.
*G06F 9/30* (2018.01)
*G06F 9/48* (2006.01)
(Continued)

(52) U.S. Cl.
CPC ........ *G06F 9/30058* (2013.01); *G06F 9/3861* (2013.01); *G06F 9/4812* (2013.01);
(Continued)

(58) Field of Classification Search
CPC .. G06F 9/30058; G06F 9/3861; G06F 9/4856; G06F 9/4812; G06F 9/30145; G06F 9/4881; G06F 9/5094
See application file for complete search history.

(56) References Cited

U.S. PATENT DOCUMENTS 8,738,860 B1   5/2014 Griffin et al.
10,095,543 B1  10/2018 Griffin et al.
(Continued)

FOREIGN PATENT DOCUMENTS

CN   101354664 A   1/2009
CN   101539798     9/2009
(Continued)

OTHER PUBLICATIONS

International Search Report and Written Opinion for International Application No. PCT/US2015/1049337, dated Dec. 15, 2015, 15 pages.
(Continued)

*Primary Examiner* — Ernest Unelus
(74) *Attorney, Agent, or Firm* — Nicholson De Vos Webster & Elliott LLP

(57) ABSTRACT

An apparatus and method are described for efficiently processing and reassigning interrupts. For example, one embodiment of an apparatus comprises: a plurality of cores; and an interrupt controller to group interrupts into a plurality of interrupt domains, each interrupt domain to have a set of one or more interrupts assigned thereto and to map the interrupts in the set to one or more of the plurality of cores.

13 Claims, 16 Drawing Sheets

(51) Int. Cl.
   *G06F 13/24* (2006.01)
   *G06F 9/38* (2018.01)

(52) U.S. Cl.
   CPC ............ *G06F 9/4856* (2013.01); *G06F 13/24* (2013.01); *G06F 9/30145* (2013.01); *G06F 9/4881* (2013.01); *G06F 2209/483* (2013.01)

(56) References Cited

U.S. PATENT DOCUMENTS

| | | | |
|---|---|---|---|
| 2009/0089470 A1* | 4/2009 | Ven | G06F 1/3203 710/260 |
| 2009/0172423 A1 | 7/2009 | Song et al. | |
| 2010/0274879 A1 | 10/2010 | Wolfe | |
| 2011/0040913 A1 | 2/2011 | Chung et al. | |
| 2011/0145461 A1 | 6/2011 | Zhao et al. | |
| 2013/0318334 A1 | 11/2013 | Waskiewicz, Jr. | |
| 2014/0129808 A1 | 5/2014 | Naveh et al. | |

FOREIGN PATENT DOCUMENTS

| | | |
|---|---|---|
| CN | 101872314 A | 10/2010 |
| CN | 101901165 A | 12/2010 |
| CN | 102063335 A | 5/2011 |
| CN | 102483705 A | 5/2012 |
| WO | 2012078334 A1 | 6/2012 |
| WO | 2013162523 A1 | 10/2013 |

OTHER PUBLICATIONS

International Preliminary Report on Patentability for International Application No. PCT/US2015/1049337, dated Apr. 6, 2017, 12 pages.
Extended European Search Report for European Application No. 15844406.7, dated Apr. 6, 2018, 7 pages.
First Office Action and translation for Chinese Application No. 201580045622.9, dated Feb. 22, 2019, 25 pages.
Third Office Action, CN App. No. 201580045622.9, dated Mar. 16, 2020, 7 pages (4 pages of English Translation and 3 pages of Original Document).
Final Office Action, U.S. Appl. No. 14/861,618, dated Nov. 28, 2017, 13 pages.
Non-Final Office Action, U.S. Appl. No. 14/861,618, dated Mar. 26, 2018, 13 pages.
Non-Final Office Action, U.S. Appl. No. 14/861,618, dated May 15, 2017, 14 pages.
Notice of Allowance, U.S. Appl. No. 14/861,618, dated Oct. 24, 2018, 18 pages.
Office Action, CN App No. 201580045622.9, dated Mar. 16, 2020, 3 pages (Original Document Only).
Office Action, IN App. No. 4721/CHE/2014, dated Jun. 28, 2019, 8 pages.
Search Report, CN App. No. 201580045622.9, dated Feb. 12, 2019, 2 pages.
Second Office Action, CN App. No. 201580045622.9, dated Oct. 9, 2019, 22 pages. (13 pages of English Translation and 9 pages of Original Document).
Notice of Allowance, CN App. No. 201580045622.9, dated Aug. 12, 2020, 5 pages (3 pages of English Translation and 2 pages of Original Document).
Notice of Allowance, KR App. No. 10-2017-7005138, dated Sep. 1, 2020, 3 pages (1 page of English Translation and 2 pages of Original Document).
Arm, "Arm® CoreLink™ GIC-500 Generic Interrupt Controller", Revision: r0p0, Technical Reference Manual, Arm DDI 0516B (ID060914), 2014, 83 pages.
Arm, "Arm® Generic Interrupt Controller", Architecture version 2.0, Architecture Specification, Arm IHI 0048B.b (ID072613), 2008, 214 pages.
Arm, "Arm® Cortex®—A53 MPCore Processor", Revision: r0p2, Technical Reference Manual, Arm DDI 0500D (ID021414), 2013, 19 pages.

* cited by examiner

APPARATUS AND METHOD FOR CONFIGURING SETS OF INTERRUPTS

CROSS REFERENCE TO RELATED APPLICATIONS

This application is a continuation of U.S. application Ser. No. 14/861,618, filed Sep. 22, 2015, which claims priority under 35 U.S.C. § 119 to Indian Patent Application No. 4721/CHE/2014, filed Jan. 6, 2015, entitled, "Apparatus And Method For Configuring Sets Of Interrupts" which claims the benefit of Indian Provisional Patent Application No. 4721/CHE/2014, filed Sep. 26, 2014, entitled, "Apparatus And Method For Configuring Sets Of Interrupts" all of which is herein incorporated by reference.

FIELD OF THE INVENTION

Embodiments of the invention relate generally to the field of computer systems. More particularly, the embodiments of the invention relate to an apparatus and method for programming sets of interrupts.

BACKGROUND

In computing systems, an interrupt is a signal generated by hardware or software indicating an event that needs immediate attention from the processor (i.e., requiring an interruption of the current thread the processor is executing). The processor responds by suspending its current execution thread, saving the state (so that it can re-start execution where it left off), and executing a function referred to as an interrupt handler to service the event. The interruption is temporary; after the interrupt handler completes, the processor resumes execution of the thread.

Hardware interrupts are used by devices to communicate that they require attention from the operating system and are implemented using electronic alerting signals that are sent to the processor. For example, a keyboard or mouse may trigger an interrupt request in response to a user pressing a key on the keyboard or moving the mouse, respectively. In response, the processor is interrupted to read the keystroke or mouse position. The act of initiating a hardware interrupt is referred to as an interrupt request. The number of hardware interrupts is limited by the number of interrupt request (IRQ) lines to the processor, but there may be hundreds of different software interrupts.

Current multi-processor and/or multi-core systems rely on Advanced Programmable Interrupt Controllers (APICs) to process interrupts directed to different processor/cores. The APIC may be a split architecture design, with a local component (LAPIC) usually integrated into the processors/cores, and an optional input/output (I/O)-APIC on a system bus.

In the IO-APIC, the Interrupt Distribution is either based on a fixed destination or a redirectable destination. Often, embedded systems which cannot use Symmetric Multiprocessing opt to use a fixed destination mode. In such cases, the destination of an interrupt has to be reprogrammed frequently for various reasons. The affinity of interrupts towards certain core(s)/processor(s) in fixed destination mode needs to be reconfigured depending on the use case being executed. Reconfiguring interrupts one at a time becomes an overhead and this latency due to reprogramming can impact system performance.

BRIEF DESCRIPTION OF THE DRAWINGS

A better understanding of the present invention can be obtained from the following detailed description in conjunction with the following drawings, in which.

DETAILED DESCRIPTION

Exemplary Processor Architectures

Figure 1:
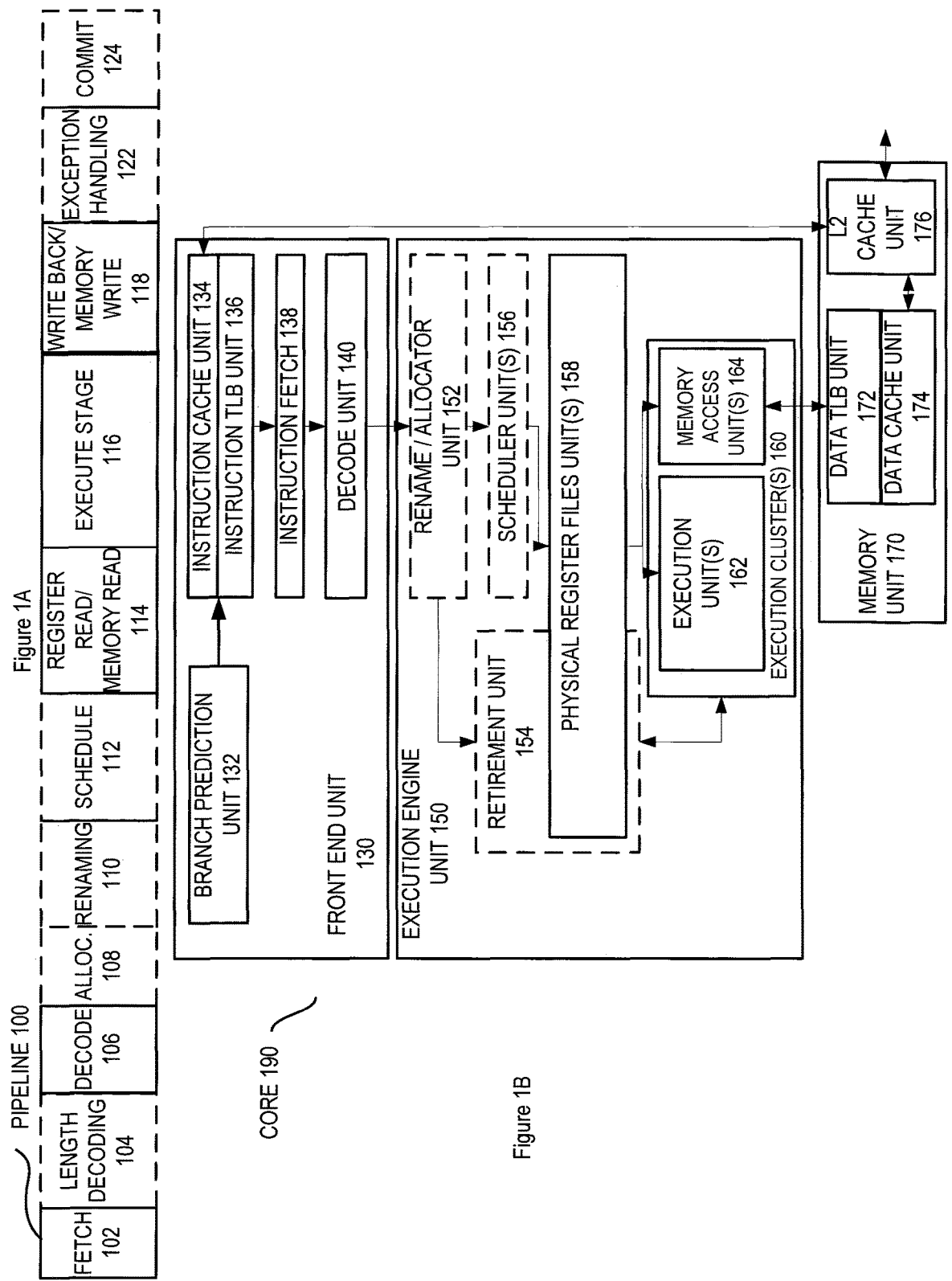
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
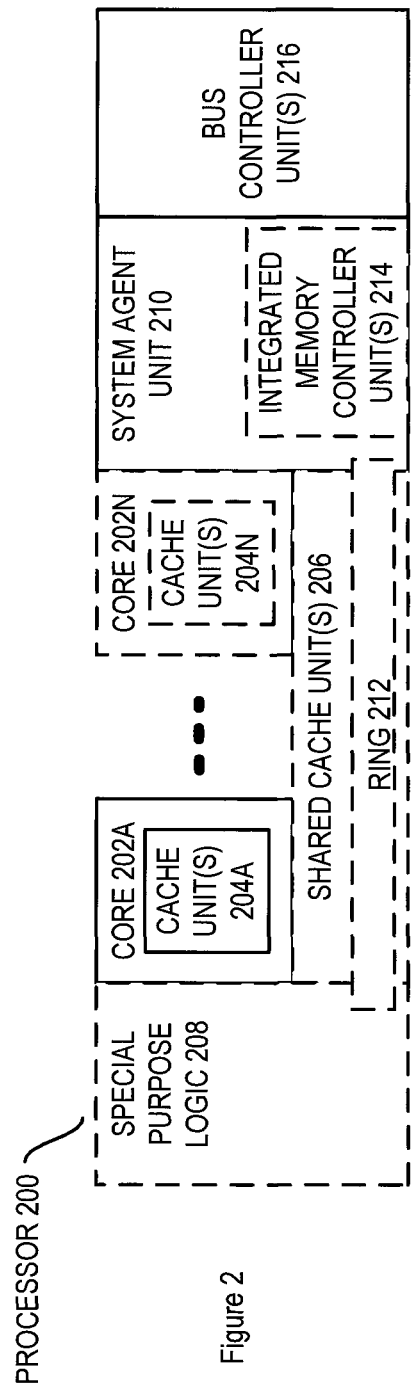
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
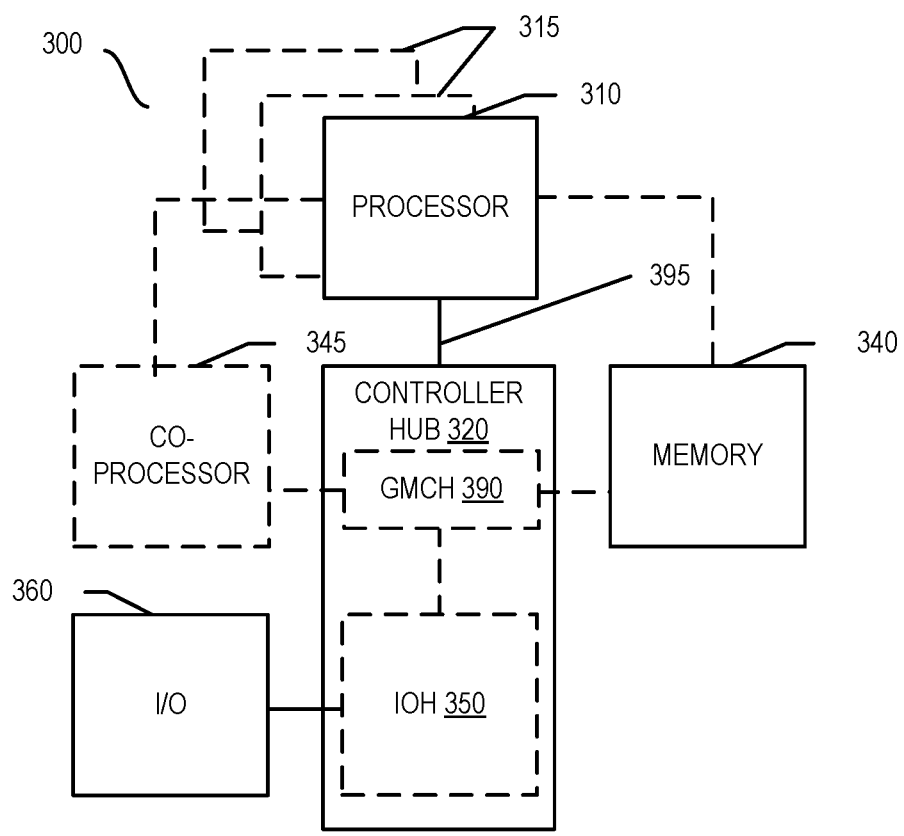
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
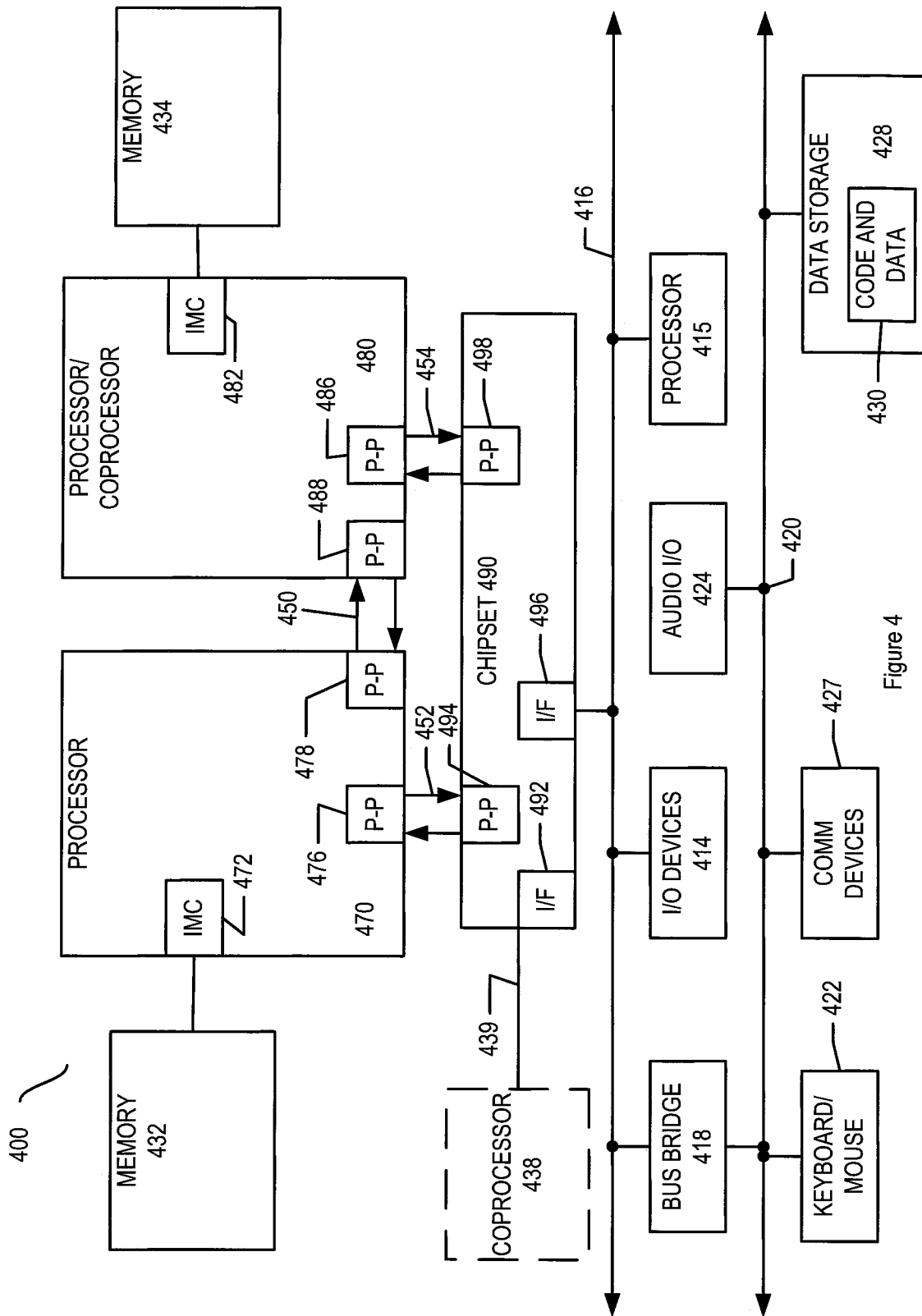
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
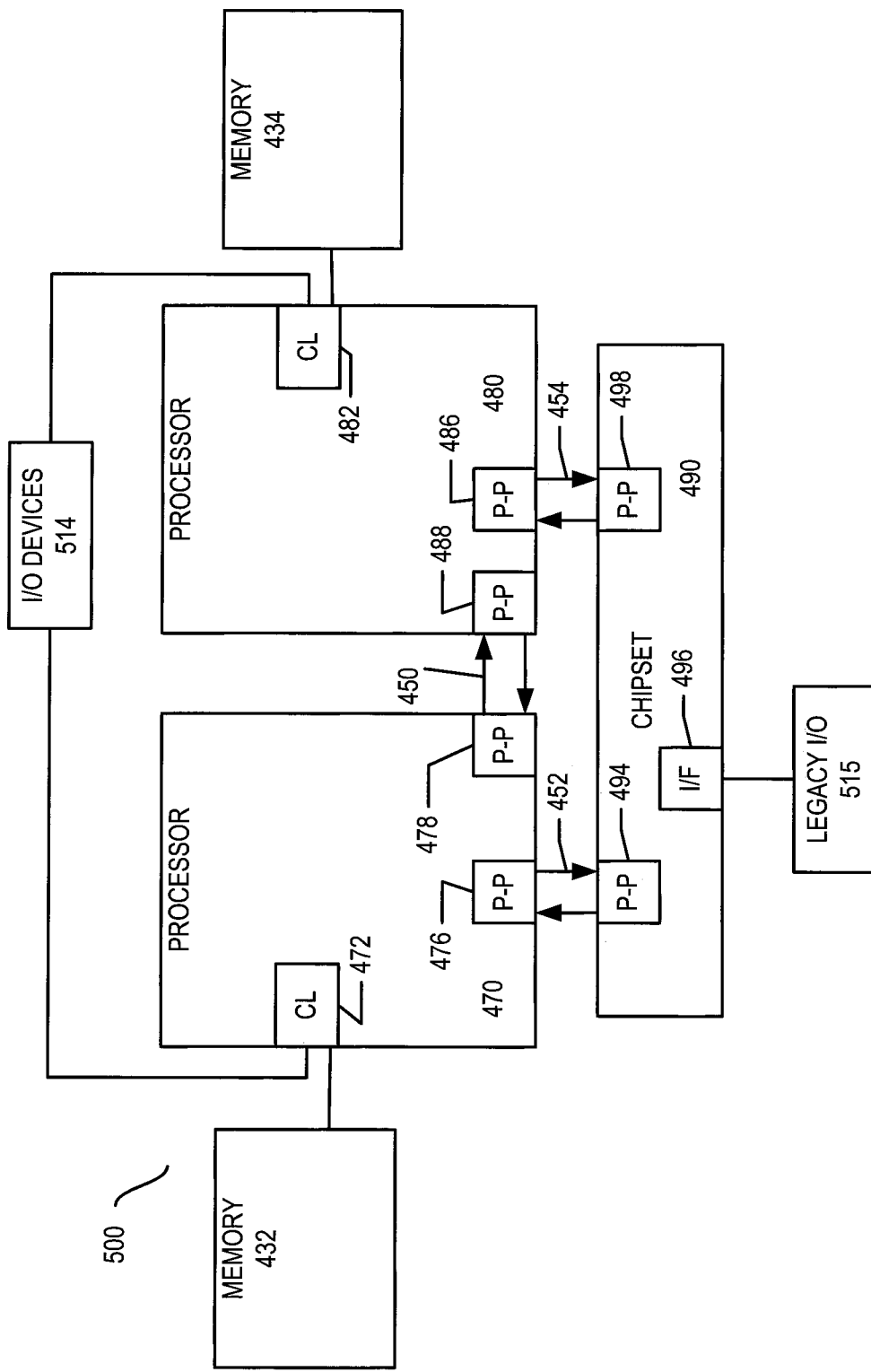
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
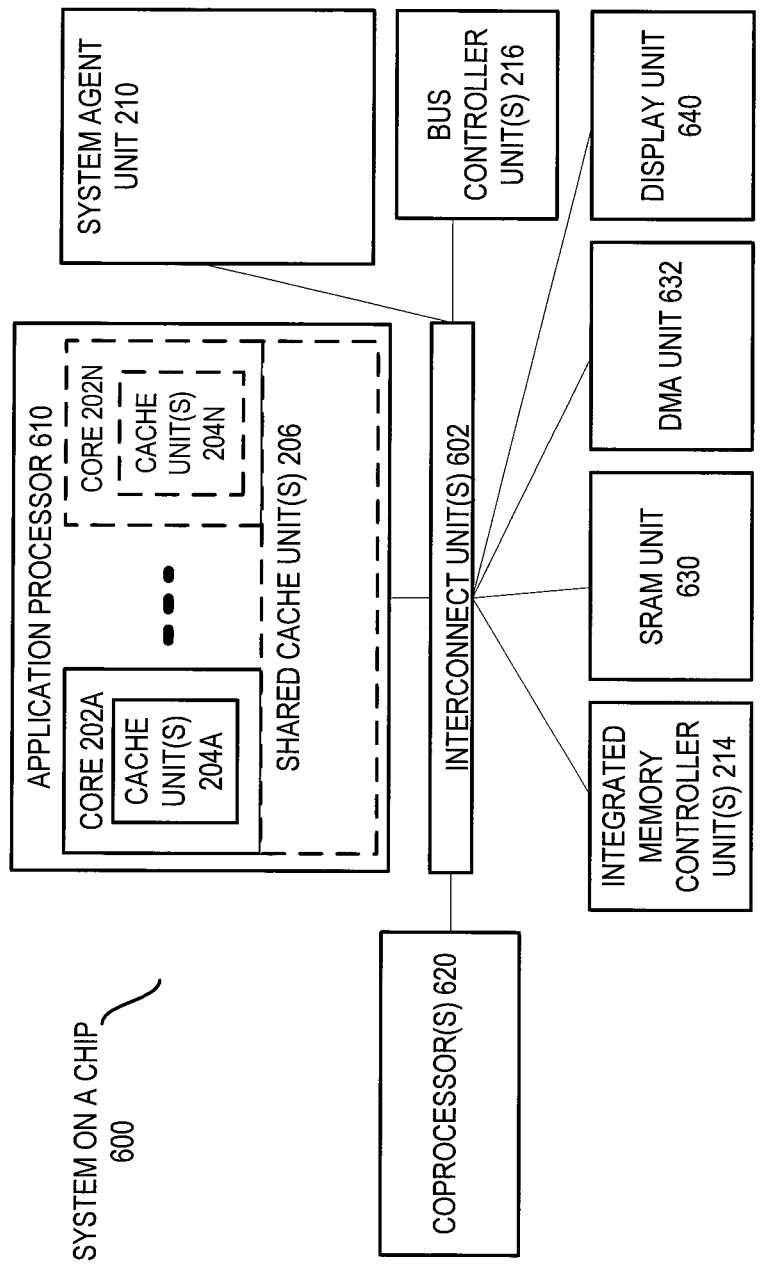
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
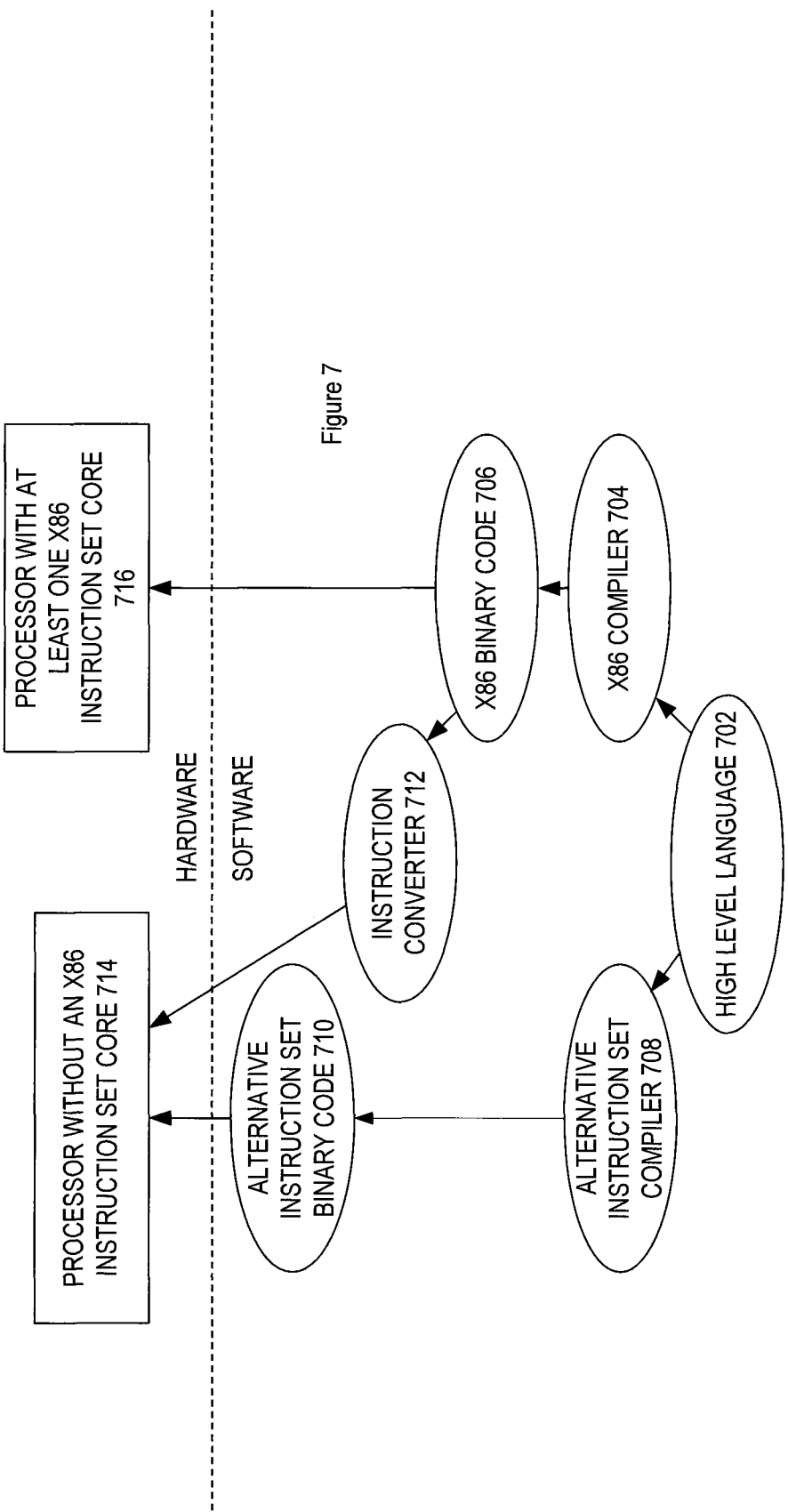
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716.

Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Configuring Sets of Interrupts

As mentioned above, the affinity of interrupts towards certain core(s)/processor(s) in fixed destination mode may need to be frequently reconfigured depending on the use case being executed. Reconfiguring interrupts one at a time becomes an overhead which can impact system performance.

The embodiments of the invention described below include techniques for configuring a set of interrupts together. In particular, one embodiment includes an interrupt controller for a multi-processor and/or multicore processor in which sets of interrupts are intelligently grouped together into interrupt domains. As used herein, an interrupt domain comprises a set of one or more interrupts. Each interrupt can be made to belong to an interrupt domain and the destination for interrupt delivery is configured at the level of an interrupt domain.

In the discussion below, a set of interrelated interrupts are referred to as "Interrupt Set." The embodiments of the invention provide versatility to software implementations. In some systems, where symmetric multiprocessing is not an option, it is required that a set of interrelated Interrupt Service Routines always be executed on the same processor core. In such systems, there are use cases where an Interrupt Set has to be configured to execute on different cores at different times.

Figure 8:
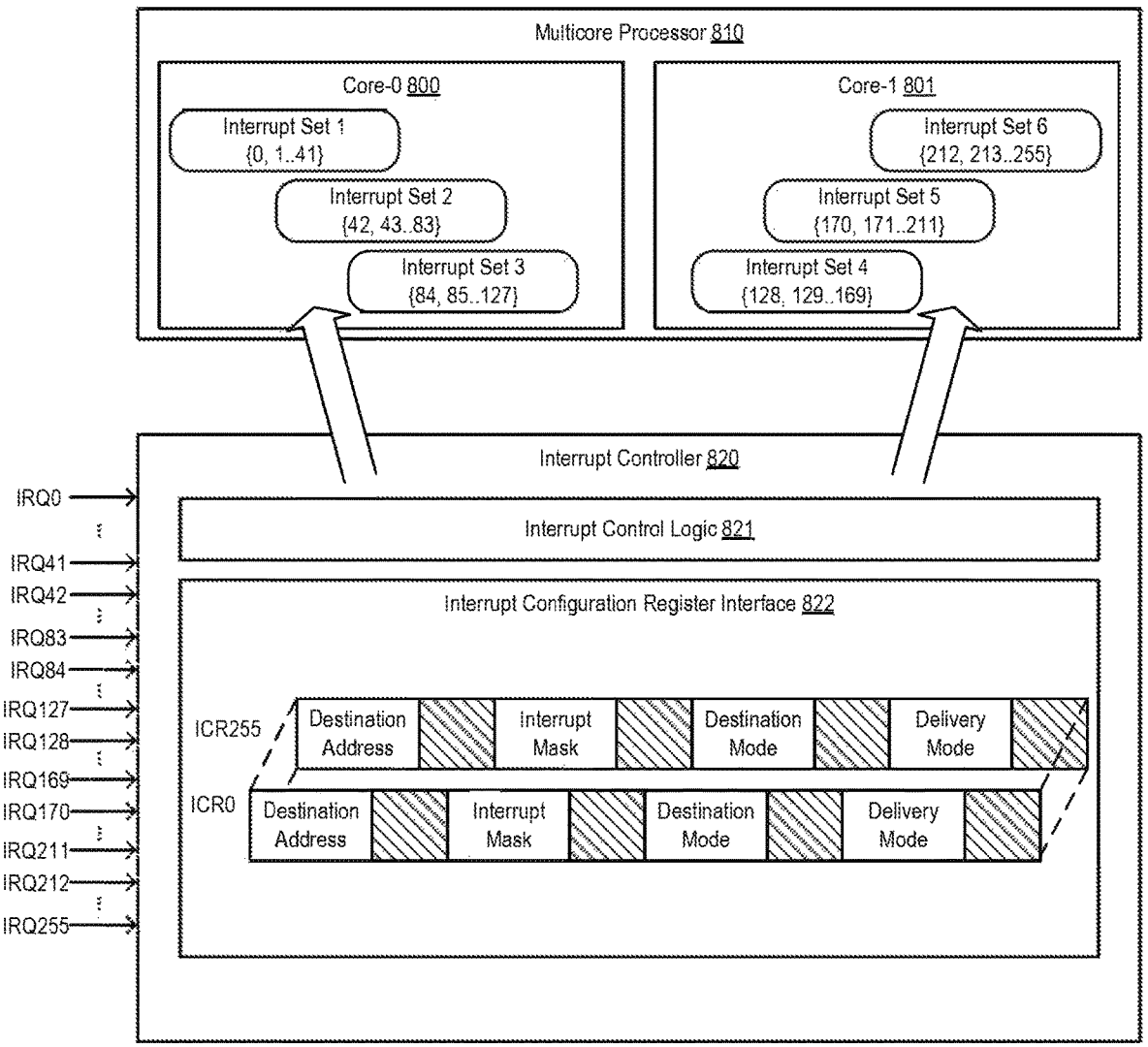
FIG. 8 illustrates different cores of a multi-core processor receiving different sets of interrupts.

FIG. 8 illustrates one embodiment of an interrupt controller 820 with interrupt control logic 821 to forward interrupts to a first core, Core-0 800, or a second core, Core-1 801, of a multi-core processor 810 based on the interrupt sets handled by each core. In the illustrated example, there are 256 interrupts (IRQ0-IRQ255) arranged into six Interrupt Sets 0-6 (e.g., IRQ0-IRQ41=Interrupt Set 1, IRQ42-IRQ83=Interrupt Set 2, etc). It should be noted, however, that the underlying principles of the invention are not limited to any particular number of interrupts or arrangement of interrupt sets.

In one embodiment, each interrupt is associated with an interrupt configuration register (ICR) accessible via an interrupt configuration register interface 822. In FIG. 8, there are 256 interrupt configuration registers, ICR0-ICR255, one for each of the possible interrupt request lines 0-255. One example of an ICR is described below with respect to FIG. 13 (which shows how an interrupt configuration register 1131 may be programmed to associate its corresponding interrupt with an interrupt domain in accordance with one embodiment of the invention). In the example illustrated in FIG. 8, the interrupt controller 820 is configured to forward interrupts from Interrupt Set-1, Interrupt Set-2 and Interrupt Set-3 to Core-0 800 and Interrupt Set-4, Interrupt Set-5 and Interrupt Set-6 to Core-1 801. Interrupt set 1 includes interrupts 0-41; interrupt set 2 includes interrupts 42-83; interrupt set 3 includes interrupts 84-127; interrupt set 4 includes interrupts 128-169; interrupt set 5 includes interrupts 170-211; and interrupt set 6 includes interrupts 212-255.

Specific use cases, including those in which one or more Interrupt Sets are required to be reconfigured, are described below.

Usecase-1: Switching OFF a Processor Core to Save Power

Figure 9:
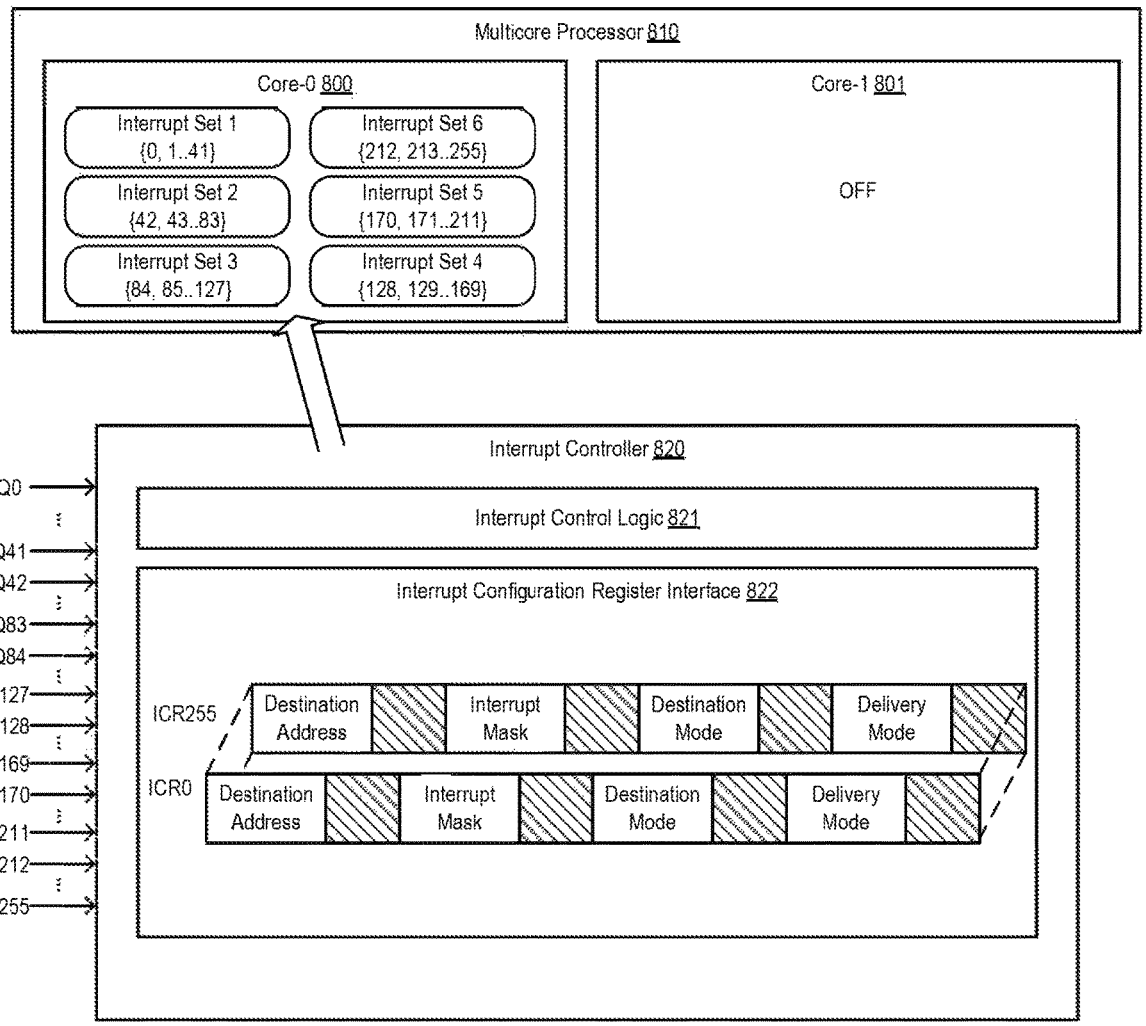
FIG. 9 illustrates an interrupt controller reallocating interrupts so that one core receives all of the interrupts and the other core may be switched off.

As illustrated in FIG. 9, if the load on Core-0 800 reduces (e.g., below a specified threshold), Interrupt Sets 4-6 on Core-1 801 could be targeted to Core-0 800. Consequently, Core-1 801 may now be put into a switched off state as illustrated (or in another low power state). In this case, the interrupt controller 820 retargets all Interrupt Sets that were targeted to Core-1 801 to Core-0 800.

Usecase-2: Switching ON a Processor Core

In contrast to Use Case 1, if the load on Core-0 800 exceeds certain limits, it may become beneficial to switch ON Core-1 801. In this scenario, some of the Interrupt Sets may need to be retargeted back to Core-1 801, to achieve a situation similar to that in FIG. 8.

Usecase-3: Migration of an Interrupt Set

Figure 10:
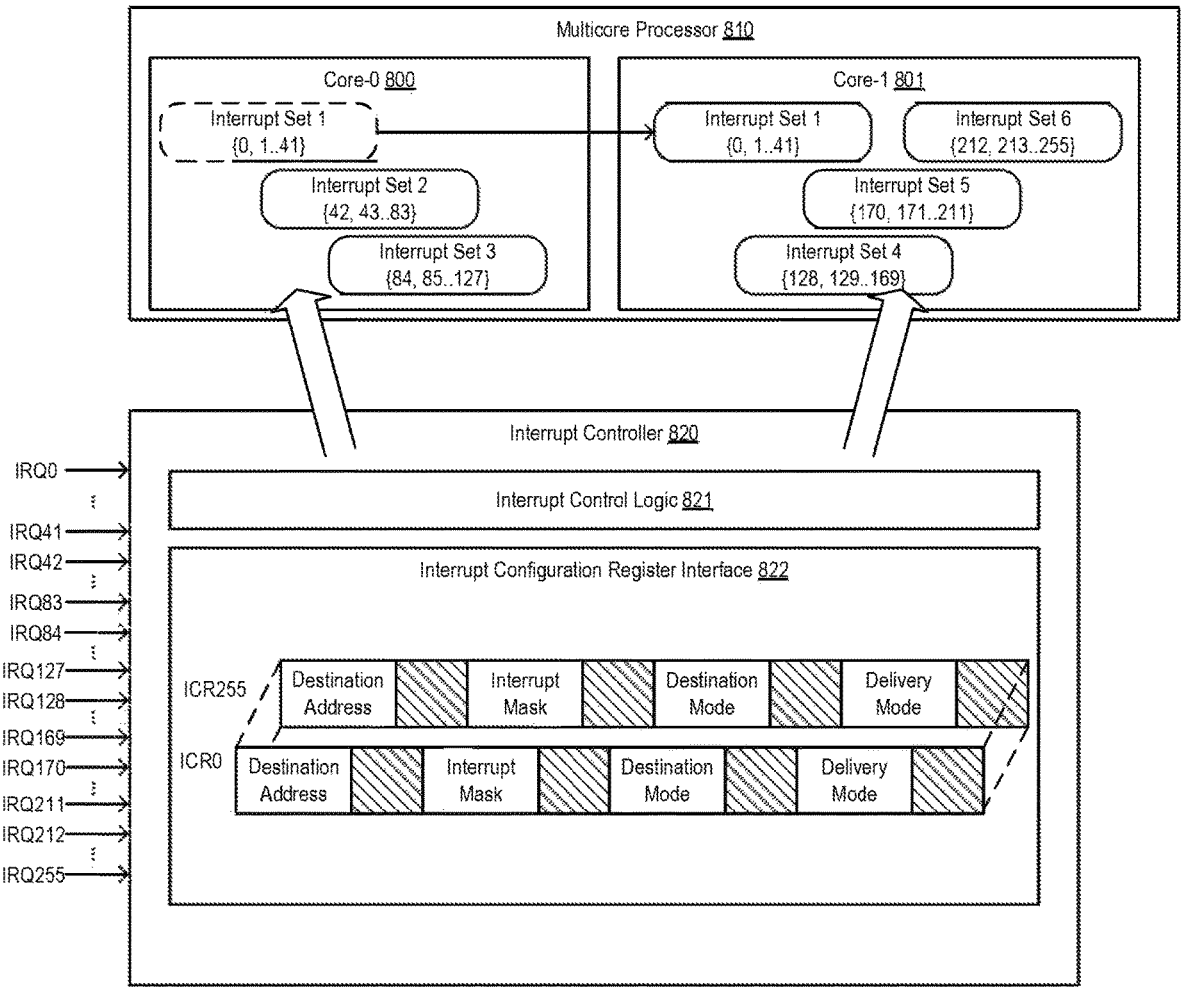
FIG. 10 illustrates an interrupt controller performing load balancing such that one core receives more interrupts than another core, based on detected load.

In some implementations, software may decide to migrate the interrupt set from one core to another. For example, if there is an imbalance of load across cores (e.g., because one core is processing a thread consuming significant processor resources), it may be prudent to target one or more Interrupt Sets to those cores that are less loaded. In FIG. 10, for example, it has been determined that Core-0 800 is more heavily loaded than Core-1 801. As such, the interrupt controller 820 has retargeted Interrupt Set-1 from Core-0 800 to Core-1 801 to balance the load on both cores.

In all the above use cases, current implementations require each interrupt line to be programmed individually (i.e., one at a time) which significantly increases latency. The latency of programming each interrupt individually can turn out to be a significant bottleneck if the frequency of such reprogramming is high.

One embodiment of the invention avoids this bottleneck by facilitating atomic programming of an Interrupt Set. In particular, the interrupt controller 820 can define an optimum number of interrupt domains. In the example provided below, there are 16 interrupt domains among 256 interrupts. It should be noted, however, that the underlying principles of the invention are not limited to any particular number of interrupt domains or interrupts. Each interrupt can be configured to belong to an Interrupt Domain. Such interrupts belonging to an interrupt domain will inherit the properties of that interrupt domain. In one embodiment, one of the properties of each interrupt domain is the destination core to which the interrupts of the interrupt domain should be delivered. Other properties can include, by way of example and not limitation, masking, enabling and disabling of an Interrupt Set. By grouping interrupts into domains and then providing the ability to configure domain properties, only a single configuration operation for each interrupt domain is performed, thereby significantly reducing the latency associated with individual interrupt programming.

Figure 11A:
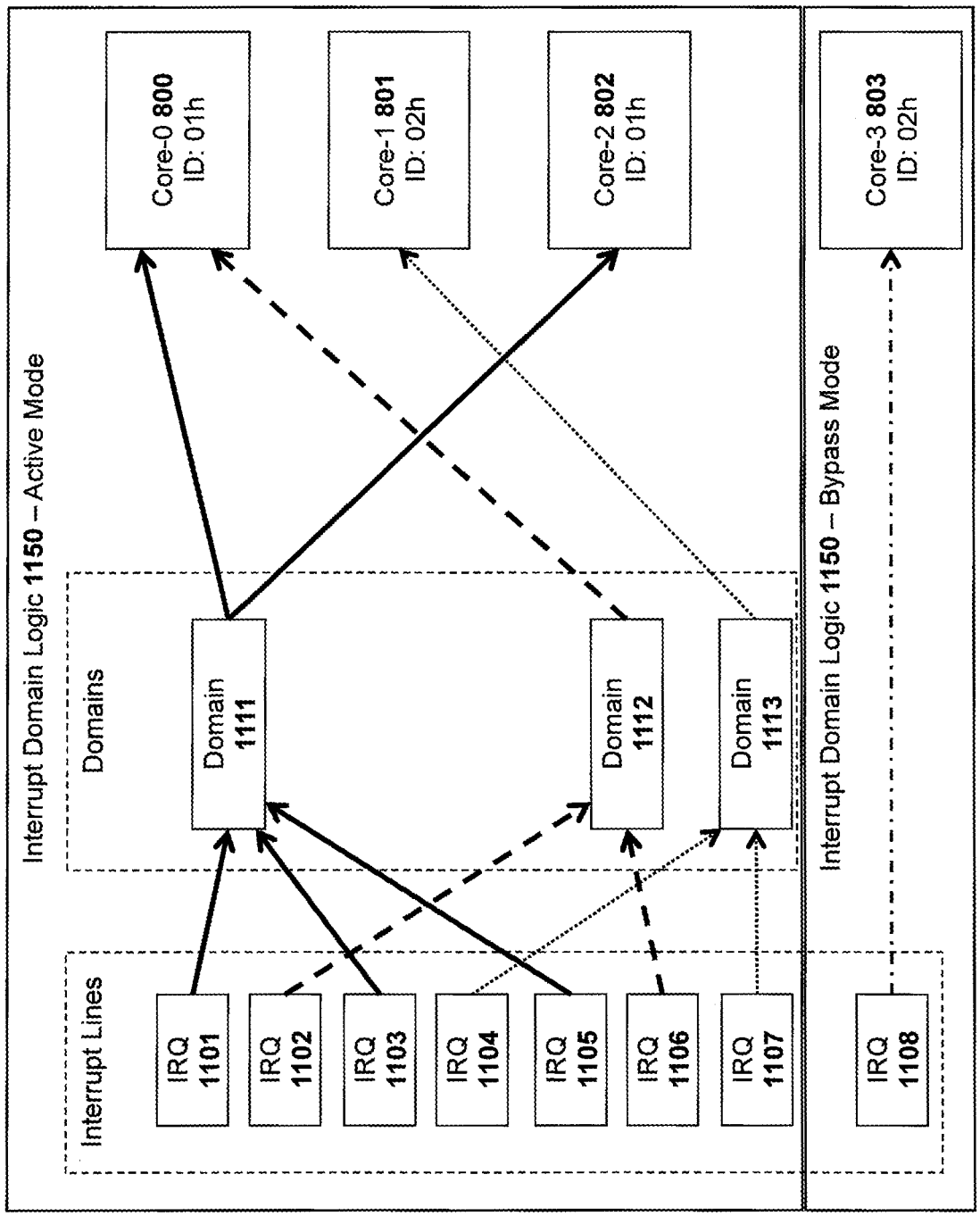
FIGS. 11A-B illustrate one embodiment of the invention in which interrupts are managed at the granularity of interrupt domains.
Figure 13:
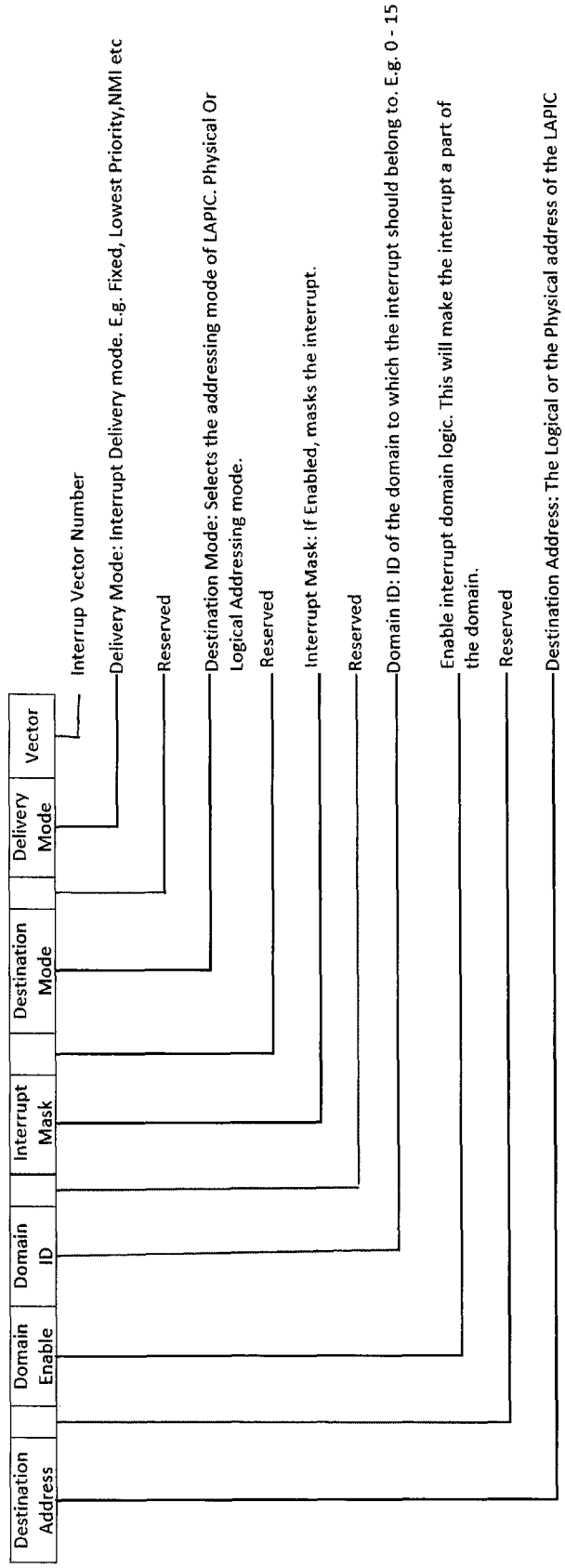
FIG. 13 illustrates an embodiment of an interrupt configuration register.

As illustrated in FIG. 11A, interrupt domain logic 1150 implemented within the interrupt controller 820 assigns each of a plurality of interrupt lines 1101-1108 to one of a plurality of interrupt domains 1111-1113. In one embodiment, an interrupt configuration register 1131 such as shown in FIG. 13 includes data specifying the mapping between that particular interrupt line 1101-1108 and an interrupt domain 1111-1113. In the specific example shown, interrupt lines 1101, 1103, and 1105 are all assigned to interrupt domain 1111; interrupt lines 1102 and 1106 are all assigned to interrupt domain 1112; interrupt lines 1104 and 1107 are all assigned to interrupt domain 1113. In addition, FIG. 11A illustrates that some interrupt lines, such as interrupt line 1108, may not be assigned to an interrupt domain. As illustrated, the interrupt domain logic 1150 may operate in an "active mode" for certain interrupt lines 1101-1107, employing interrupt domains 1111-1113 as described, and may operate in a "bypass mode" for those interrupt lines not assigned to a domain.

In one embodiment, each interrupt domain 1111-1113 is configured to send an interrupt to a fixed core or a fixed group of cores. For example, in FIG. 11A interrupt domain 1111 is configured to send interrupts to either Core-0 800 or Core-2 802. Interrupt domain 1112 is configured to send interrupts only to Core-0 800 and interrupt domain 1113 is configured to send interrupts only to Core-1 801. In one embodiment, if the destination core for the interrupts is to be changed, it may be done simply by reprogramming the destination core associated with the interrupt domain (rather than piecemeal programming of each individual interrupt).

Figure 11B:
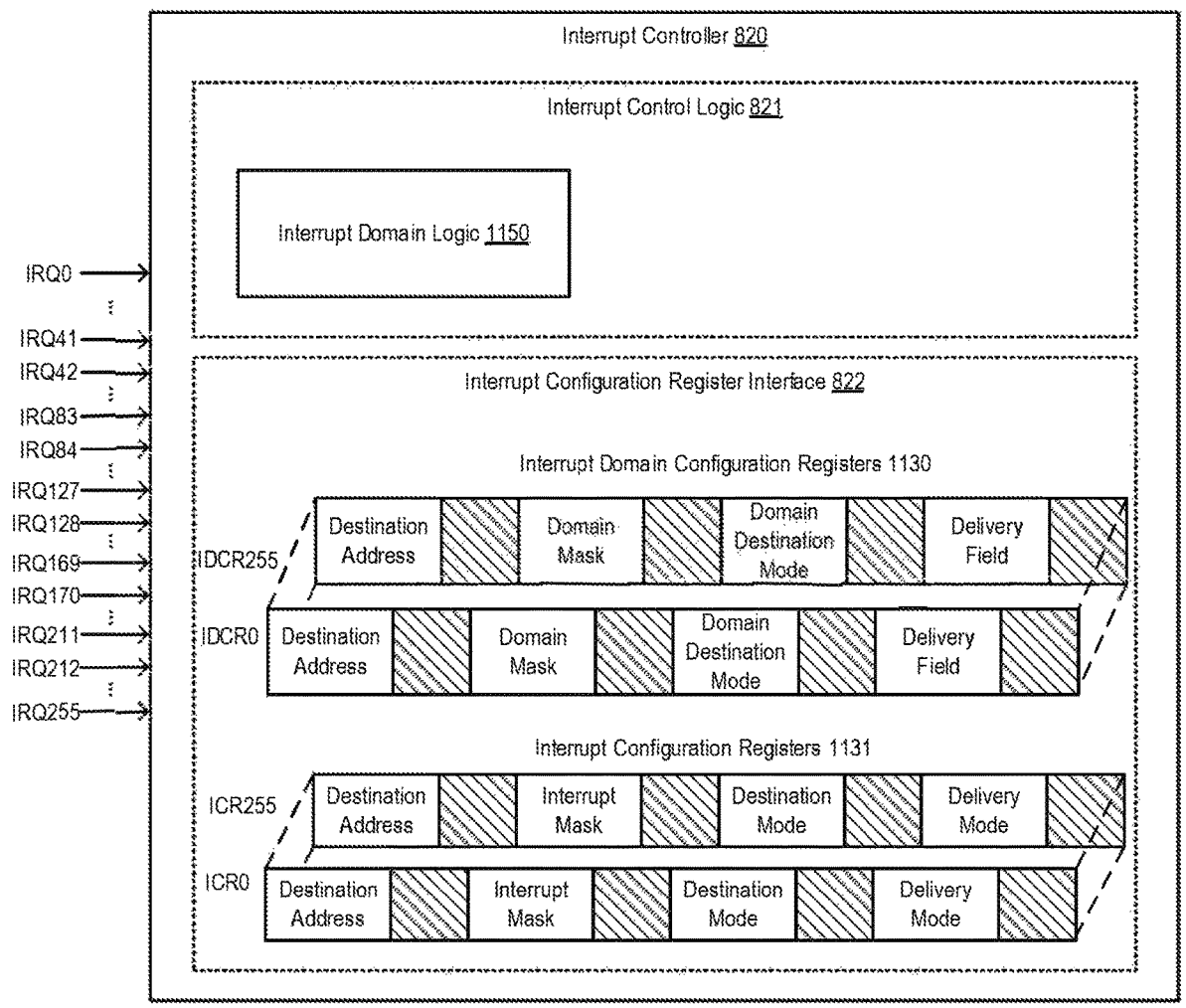

As illustrated in the embodiment in FIG. 11B, the interrupt control logic 821 includes interrupt domain logic 1150 for processing interrupts in accordance with interrupt domains as described herein. In addition, the interrupt configuration register interface 822 provides the interrupt controller 820 access to the interrupt domain configuration register(s) (IDCRs) 1130 and interrupt configuration registers (ICR) 1131. As described below, these two sets of registers may be dynamically programmed to assign interrupts to interrupt domains and to assign interrupt domains to cores/processors as described herein.

Figure 12:
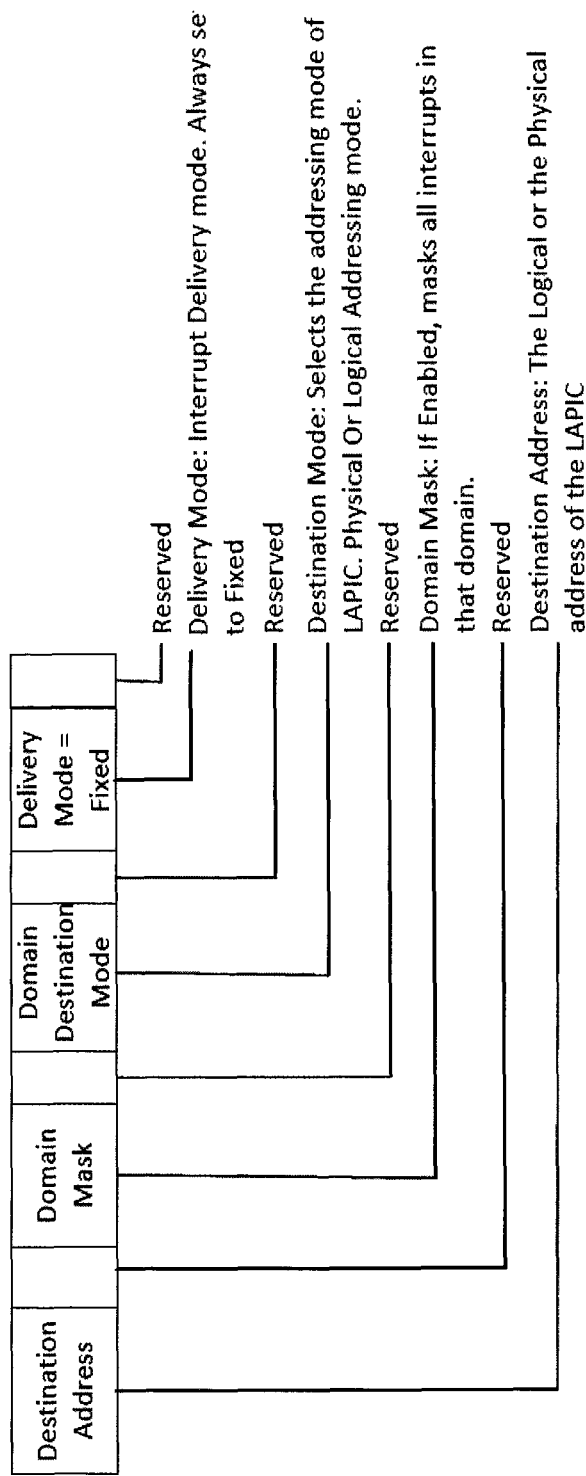
FIG. 12 illustrates one embodiment of an interrupt domain configuration register.

FIG. 12 illustrates one embodiment of an interrupt domain configuration register comprising entries for 16 programmed interrupt domains (INTDOM_0, INTDOM_1, ... INTDOM_16). In this example, each domain can be configured with a different destination address field (DSTF) which is the address of the destination processor(s)/core(s) to receive interrupts for this domain. For example, in one embodiment, the first 8 bits (D0-D7) of each 64 bit IDCR entry comprise DSTF. By way example, and not limitation, the 8 bit APIC ID or logical mask of a group of APICs may be programmed in the DSTF. In one embodiment, the DSTF field may encode the logical or the physical address of the LAPIC.

Other fields illustrated in FIG. 12 include a delivery mode (DELM) field which specifies additional parameters for interrupt delivery. In one embodiment, a Fixed delivery mode is specified in which the interrupt signal is delivered to all processor(s)/core(s) specified by the DSTF field. The DELM may also specify Lowest Priority mode in which the interrupt signal is delivered to the processor core that is executing at the lowest priority among all the processors listed in the destination field. Other known interrupt delivery modes may also be implemented.

In one embodiment, the domain destination mode (DSTM) field comprises a 1 bit field which indicates whether physical or logical addressing is used by the interrupt controller 820. Finally, a domain mask bit indicates whether an interrupt mask is used. In one embodiment, a value of 1 indicates that the interrupt signals in that domain are masked.

Thus, the interrupt domain configuration register(s) 1130 described above allow for atomic programming of an entire interrupt domain. It should be noted, however, that various modifications to the encoding used in the interrupt domain configuration registers 1130 while still complying with the underlying principles of the invention.

FIG. 13 illustrates one example of how an interrupt configuration register 1131 may be programmed to associate its corresponding interrupt with an interrupt domain. In particular, a new 4-bit field, Domain ID, is included in the interrupt configuration register 1131 and may be encoded to identify one of the 16 interrupt domains. An interrupt would thus become a member of the specified interrupt domain. As illustrated in FIG. 11A, the ICRs 1131 may be included within and managed by the interrupt controller 820. In one embodiment, a 1-bit Domain Enable field can be programmed to make the corresponding interrupt a member of an interrupt domain specified by the Domain ID.

Other known fields illustrated in FIG. 13 include an 8-bit Interrupt Vector (INTVEC) field which is a vector number identifying the specific interrupt (e.g., 32-255 in the current APIC). All other fields of the ICR 1131 are applicable only if EN_INTDOM in ICR 1131 is set to 0. A delivery mode (DELM) field may include the same or similar parameters to those described above for the IDCR (e.g., Fixed, Lowest Priority). Similarly, the destination mode (DSTM) bit indicates whether Physical or Logical Addressing of the APIC is used and a destination field (DSTF) is the destination address of the processor to which interrupts belonging to that domain will be delivered to (e.g., the 8 bit APIC ID or logical mask of a group of APICs may be programmed here). It should be noted, however, that various modifications to the encoding used in the interrupt configuration registers 1131 while still complying with the underlying principles of the invention.

Figure 14:
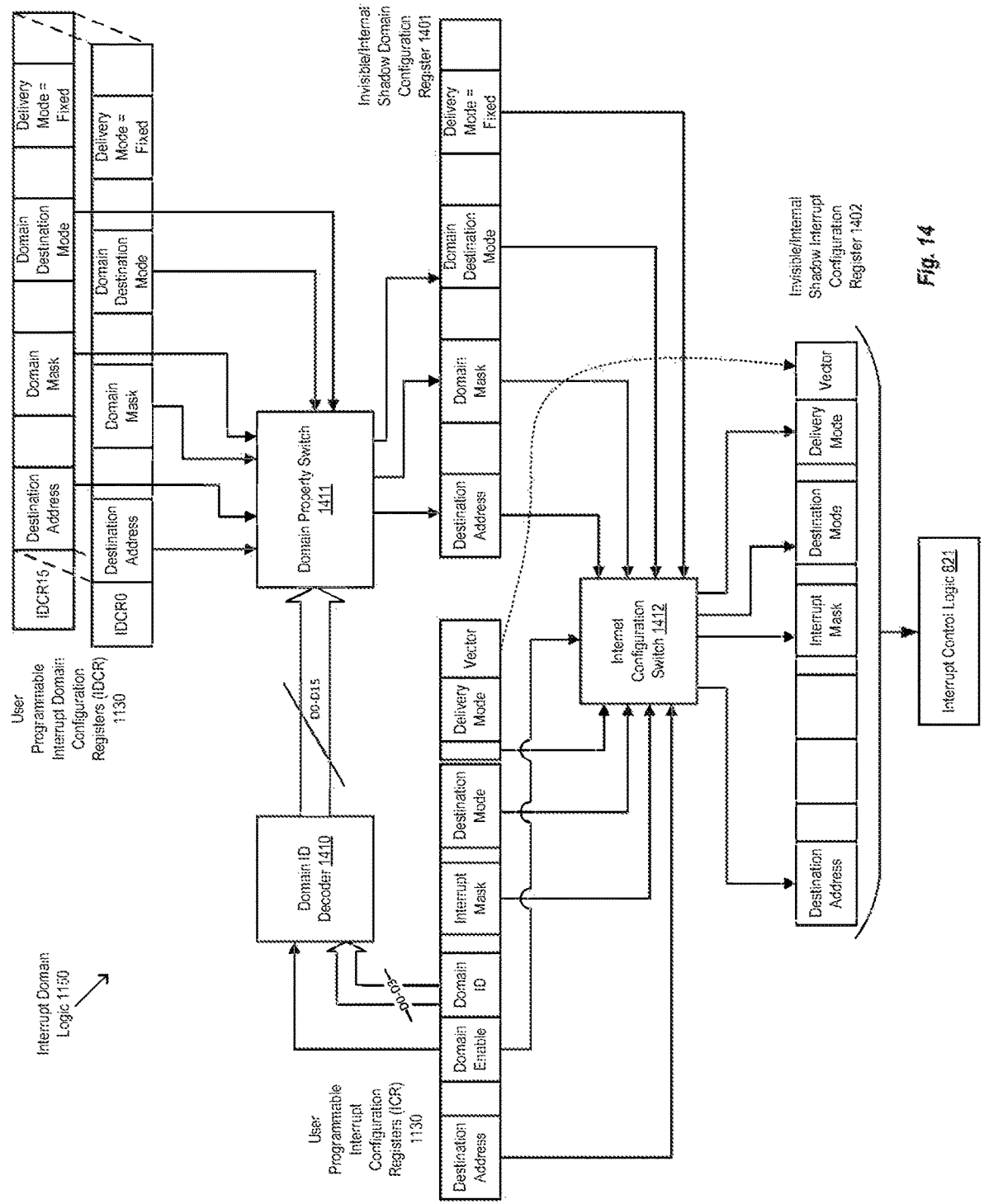
FIG. 14 illustrates interrupt domain logic in accordance with one embodiment of the invention.
Figure 15:
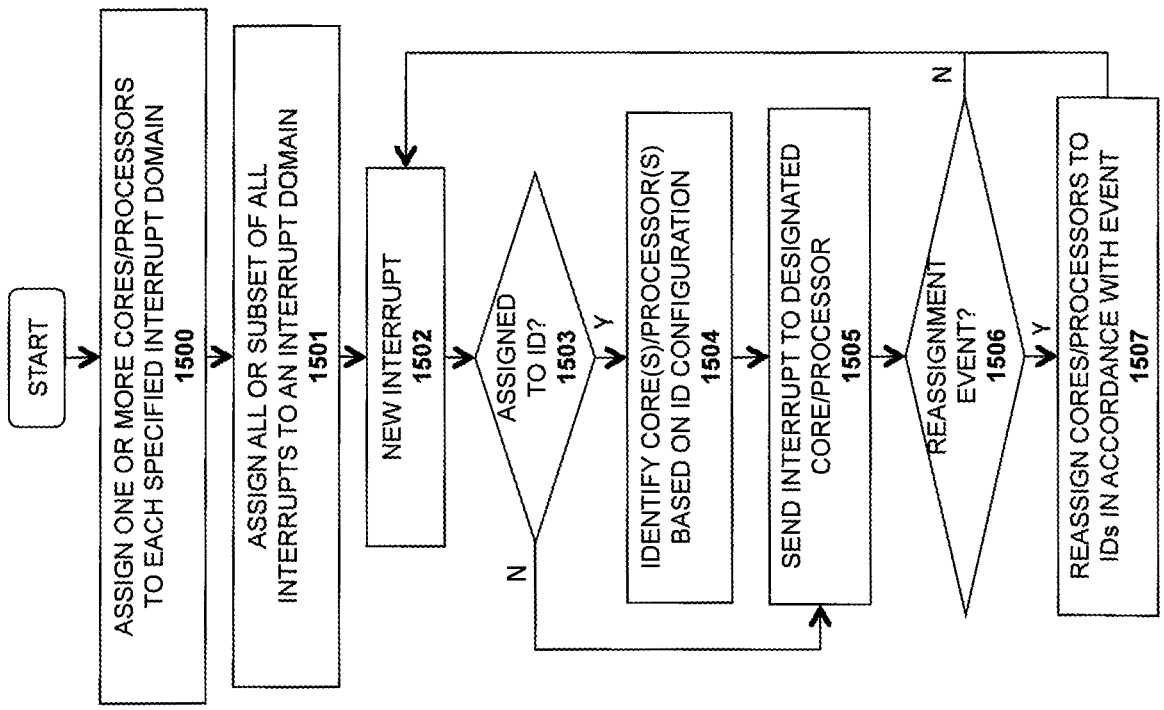
FIG. 15 illustrates a method in accordance with one embodiment of the invention.

FIG. 14 illustrates how the interrupt domain logic 1150 may be implemented in accordance with one embodiment of the invention. Specifically, in the illustrated embodiment, the user programmable interrupt configuration registers 1131 provide data to a domain ID decoder 1410 and an interrupt configuration switch 1412. The output of the domain ID decoder 1410 and data from the user programmable interrupt domain configuration registers 1130 are provided to a domain property switch 1411 which responsively updates data contained in an internal shadow domain configuration register 1401. An interrupt configuration switch 1412 then uses the information from the internal shadow domain configuration register 1401 and the user programmable interrupt configuration registers 1131 to generate data into an internal shadow interrupt configuration register 1402, which may be used directly by the interrupt control logic to forward an interrupt to the appropriate core/processor.

In one embodiment, the interrupt domain logic 1150 operates in two modes: Bypass and Active. When in bypass mode, if the "Domain Enable" bit is disabled in the ICR 1131, the interrupt control logic 821 will use the interrupt configuration as specified in the ICR. When in active mode, if the "Domain Enable" bit is enabled in the ICR 1131, the interrupt control logic 821 will use the configuration as specified in the IDCR 1130 corresponding to the Domain ID which may be read from the ICR 1131, decoded by the domain ID decoder 1410, and provided to the domain property switch 1411. In one embodiment, the interrupt will be delivered only if the domain mask is disabled.

In one embodiment, the domain ID decoder 1410 is a simple decoder (e.g., a 4:16 bit decoder in the illustrated embodiment) which enables the domain property switch 1411 to select an appropriate domain configuration. In response to the decoded domain ID, the domain property switch 1411 selects the configuration of a domain and copies the configuration of the domain into the internal shadow domain configuration register 1401.

In one embodiment, the interrupt configuration switch 1412 selects the interrupt configuration either from the individual interrupt configuration specified by the ICR 1131 (if the domain is disabled) or from the internal shadow domain configuration register 1401 (if the domain is enabled).

Thus, if an interrupt is associated with a domain, the domains' configuration will be used to determine the actions related to that interrupt.

The following pseudo-code shows an example of reconfiguring interrupts with and without interrupt domains.

Without Interrupt Domain:

```
processor_id = 0x1; /* New Destination adress */
dst_addr_pos = 60; /* Bit position of the destination address */
interrupt_ids[ ] = {0 , 10 , 12 , 15 , 20) /* Example list of interrupt IDs * /
void reconfigure_interrupts (unsigned int num_ interrupts, unsigned int * interrupt_ids,
unsigned int processor_id)
{
    X = disable_interrupts( ); /* disable at global level */
    {
    ICR[interrupt ids [0]] = processor id<<dst_addr_pos | ICR[interrupt_ids[0]];
    /* ICR [0]*/
    ICR[interrupt ids [1]] = processor id<<dst_addr_pos | ICR[interrupt_ids[1]];
    /* ICR [10]*/
    ICR[interrupt ids [2]] = processor id<<dst_addr_pos | ICR[interrupt_ids[2]];
    /* ICR [12]*/
    ICR[interrupt ids [3]] = processor id<<dst_addr_pos | ICR[interrupt_ids[3]];
    /* ICR [15]*/
    ICR[interrupt ids [4]] = processor id<<dst_addr_pos | ICR[interrupt_ids[4]];
    /* ICR [20]*/
    }
enable_interrupts (X) ; /* enable at global level */
The computing time of the above is O(n) where n is number of interrupts to be
reconfigured.
```

With Interrupt Domain:

```
domain_id = 0 ; /* Domain id that is to be reconfigured */
processor id 0x1; /* New Destination address */
dst_addr_pos = 60; /* Bit position of the destination address */
void reconfigure_interruptdomain (unsigned int domain_id, unsigned int
processor_id)
{
    X = disable interrupts( ); /* disable at global or domain level */
IDCR[domain_id] = processor_id<<dst_addr_pos | IDCR[domain_id];
/* ONLY ONE REGISTER WRITE ! */
    enable_interrupts (X); /* enable at global or domain level */
}
```

The computing time of the above is O(m) where m=1 for number of interrupts supported per domain. Thus if n is the number of interrupts per domain, computing time and duration for which interrupts are disabled globally is reduced by factor of O(1)/O(n). The effect of configuring all interrupts in an Interrupt Set can be achieved by programming one register, if the logic described above is implemented in hardware. This will allow software to program a set of interrupts atomically.

A method in accordance with one embodiment of the invention is illustrated in FIG. 16. The method may be implemented within the context of the architectures described above, but is not limited to any specific system architecture.

At 1600, a plurality of interrupt domains are assigned and one or more cores/processors are assigned to each interrupt domain. As mentioned above, in one embodiment, multiple cores/processors may be assigned to a single interrupt domain.

At 1601, interrupts (e.g., interrupt lines as shown in FIG. 11A) are grouped together within each of the interrupt domains. In one embodiment, however, certain interrupts may not be assigned to interrupt domains (e.g., such as interrupt line 1108 in FIG. 11A.

In response to the arrival of a new interrupt at 1602, a determination is made at 1603 as to whether the new interrupt is assigned to an interrupt domain. If so, then at 1604 the cores/processors which are configured to service the interrupt are identified in accordance with the interrupt domain configuration (e.g., reading from the interrupt domain configuration register 1130 described above). At 1605, the interrupt is sent to the designated core/processor (either as specified by the interrupt domain or through a standard interrupt mapping).

At 1606 a determination is made as to whether cores/processors require reassignment within the interrupt domains. For example, in a load balancing implementation, a determination may be made that one of the cores/processors is handling a processing load above a specified threshold while the other cores/processors are idle or operating at a significantly reduced load. As such, at 1607, the cores/processors may be reassigned to different interrupt domains by direct configuration of the interrupt domain configuration. For example, the core/processor with a significant load may be removed from all or a subset of its interrupt domains and the interrupts contained in that domain may be reassigned to different cores/processors which are less heavily loaded. In one embodiment, this is accomplished simply by modification of the destination address within the interrupt domain configuration register 1130.

It should be noted that the embodiments of the invention described above may be implemented to redistribute interrupts to any form of processing element including individual cores, processors (in a multi-processor system) or any other form of execution element.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. An apparatus comprising:
a plurality of cores; and
an interrupt controller coupled with the plurality of cores, the interrupt controller to receive a first interrupt request, the interrupt controller having a split design, the split design including:
a first component not local to the plurality of cores, the first component to:

access a first map to determine a first interrupt domain to which the first interrupt request is mapped, the first map to have a plurality of entries to map a plurality of different interrupt requests to corresponding interrupt domains, the entries having interrupt domain fields of at least four bits to identify the interrupt domains, wherein a plurality of different interrupts corresponding to a plurality of different interrupt requests mapped to the first interrupt domain; and access a second map to determine a destination core of the plurality of cores to which the first interrupt domain is mapped, the second map to have a plurality of entries to map a plurality of different interrupt domains to corresponding destination cores of the plurality of cores; and a second component local to the plurality of cores, the second component to forward an interrupt corresponding to the first interrupt request to the destination core based at least in part on a priority associated with the destination core, wherein the interrupt controller supports an interrupt bypassing a mapping of the interrupt to an interrupt domain by the first component.

2. The apparatus of claim 1, further comprising:

one or more interrupt domain configuration registers (IDCRs) comprising an entry for each interrupt domain, each entry to include a destination address field to identify one or more cores to service the interrupts assigned to each respective interrupt domain.

3. The apparatus of claim 2, wherein the destination address field comprises a configurable field in accordance with a processor architecture and the interrupt controller.

4. The apparatus of claim 2, further comprising:

one or more interrupt configuration registers comprising an entry for each interrupt, each entry to include an interrupt domain field to identify an interrupt domain to which the interrupt is grouped.

5. The apparatus of claim 2, wherein each entry in the IDCRs is to further include one or more of: a delivery mode field to specify one or more additional parameters for interrupt delivery, a domain mask to specify whether the interrupt is to be assigned to a domain, and a destination mode to specify whether a physical or a logical addressing mode is to be used.

6. The apparatus of claim 1, wherein, in response to a reassignment event, the interrupt controller is to dynamically reassign one or more of the interrupt domains to new cores.

7. The apparatus of claim 6, wherein the reassignment event comprises one of the cores entering into a low power state, wherein the interrupt controller is to reassign interrupt domains from the core entering into the low power state to one or more other cores.

8. The apparatus of claim 1, wherein the interrupt controller supports an atomic write operation to the second map to remap the interrupt domain from the destination core to another destination core.

9. The apparatus of claim 1, wherein the interrupt controller supports at least sixteen interrupt domains.

10. The apparatus of claim 1, wherein an entry of the first map has one bit to provide a physical versus virtual indication.

11. The apparatus of claim 1, wherein the interrupt controller comprises a storage to store at least one of the entries of the first map.

12. The apparatus of claim 1, wherein the interrupt controller comprises a storage to store at least one of the entries of the second map.

13. The apparatus of claim 1, wherein the first component is to access a destination address field in an entry of the second map to determine an address of the destination core.

* * * * *